(12) United States Patent
Challapalli et al.

(10) Patent No.: US 10,324,652 B2
(45) Date of Patent: Jun. 18, 2019

(54) METHODS FOR COPY-FREE DATA MIGRATION ACROSS FILESYSTEMS AND DEVICES THEREOF

(71) Applicant: NetApp, Inc., Sunnyvale, CA (US)

(72) Inventors: Venkata Vijay Chaitanya Challapalli, San Jose, CA (US); Ravi Lingappa Shamanna, Santa Clara, CA (US); Kumaran Nagappan, San Jose, CA (US); Santhosh Selvaraj, Santa Clara, CA (US)

(73) Assignee: NetApp, Inc., Sunnyvale, CA (US)

( * ) Notice: Subject to any disclaimer, the term of this patent is extended or adjusted under 35 U.S.C. 154(b) by 15 days.

(21) Appl. No.: 15/631,296

(22) Filed: Jun. 23, 2017

(65) Prior Publication Data

US 2018/0373457 A1    Dec. 27, 2018

(51) Int. Cl.
*G06F 3/06*    (2006.01)
*G06F 11/20*   (2006.01)

(52) U.S. Cl.
CPC .......... *G06F 3/0647* (2013.01); *G06F 3/0646* (2013.01); *G06F 3/0604* (2013.01); *G06F 11/2056* (2013.01)

(58) Field of Classification Search
CPC .... G06F 3/0647; G06F 3/0646; G06F 3/0604; G06F 11/2056; G06F 3/06

USPC ......................................... 711/156, 170, 165
See application file for complete search history.

(56) References Cited

U.S. PATENT DOCUMENTS

| 9,792,298 | B1* | 10/2017 | Taylor ................. G06F 11/1435 |
| 2012/0011176 | A1* | 1/2012 | Aizman ............ G06F 17/30203 707/822 |
| 2013/0013655 | A1* | 1/2013 | Lacapra ................ H04L 67/104 707/827 |
| 2014/0068224 | A1* | 3/2014 | Fan ........................ G06F 3/0613 711/206 |
| 2014/0108468 | A1* | 4/2014 | English ............. G06F 17/30076 707/810 |

* cited by examiner

*Primary Examiner* — Pierre Miche Bataille
(74) *Attorney, Agent, or Firm* — Pepper Hamilton LLP (57) ABSTRACT

Methods, non-transitory computer readable media, and computing devices that facilitate copy-free data migrations across filesystems. In a first step with this technology, a first set of filesystem metadata associated with a first filesystem is received. At least a portion of the first set of filesystem metadata is retrieved from a first data structure associated with the first filesystem. The first set of filesystem metadata includes a first identifier and a physical location associated with user data. A second identifier, associated with a second filesystem having a different addressing scheme than the first filesystem, is generated from at least the first identifier. A second set of filesystem metadata including the second identifier and the physical location is stored such that at least the second identifier is stored in a second data structure associated with the second filesystem.

18 Claims, 5 Drawing Sheets

METHODS FOR COPY-FREE DATA MIGRATION ACROSS FILESYSTEMS AND DEVICES THEREOF

FIELD

This technology relates to managing data storage networks and more particularly to methods and devices for migrating data across filesystems.

BACKGROUND

Storage nodes or servers in storage networks generally store data across multiple data storage devices that together comprise a data container, which is also referred to herein as an aggregate. Storage nodes may employ various forms of local data storage devices, such as hard disk drives, solid state drives, flash drives, or tape devices, as well as remote data storage devices, such as cloud storage devices or repositories for example.

Typically, the data storage devices host one or more data stores or volumes within the aggregates, which are associated with filesystems that define an overall logical arrangement of storage space in a storage network. Filesystems can have various formats and addressing schemes including block-based and extent-based addressing schemes that may utilize different sized storage blocks. User data associated with filesystems can be migrated to an upgraded version or newer release of a same filesystem, or to a completely different filesystem, which has different features and a different data layout or format.

Currently, data migration across filesystems having different formats requires copying of all of the associated user data, which has many disadvantages. Current data migrations are disruptive and time-consuming, often resulting in application time-outs, and require provisioning of additional space to handle data and metadata during the migration. Due to disruptive upgrades and large transition times, storage network administrators are resistant to upgrading or transitioning filesystems, resulting in suboptimal utilization of filesystems and associated storage networks and an inability to take advantage of new features in new releases.

DETAILED DESCRIPTION

Figure 1:
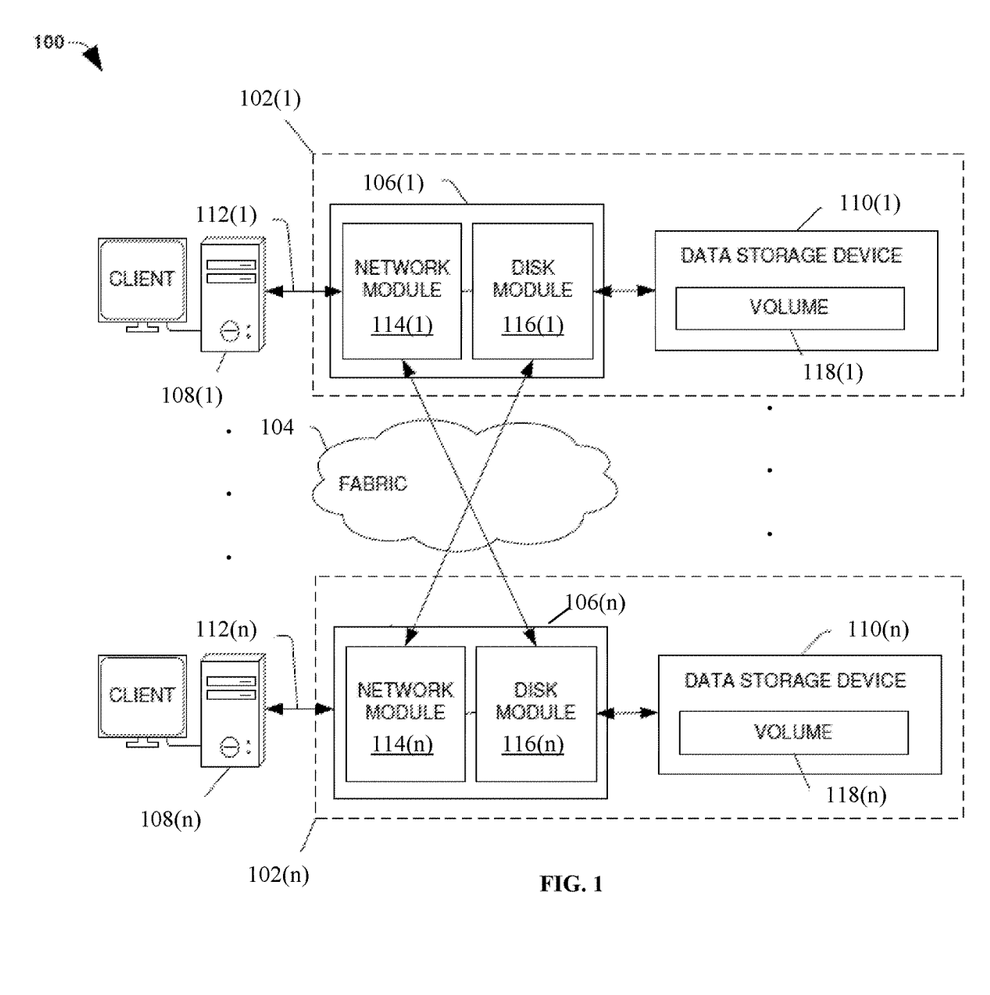
FIG. 1 is a block diagram of a network environment with exemplary data storage apparatuses each including a node computing device.

A clustered network environment 100 that may implement one or more aspects of the technology described and illustrated herein is shown in FIG. 1. The clustered network environment 100 includes data storage apparatuses 102(1)-102(n) that are coupled over a cluster fabric 104 facilitating communication between the data storage apparatuses 102(1)-102(n) (and one or more modules, components, etc. therein, such as, node computing devices 106(1)-106(n), for example), although any number of other elements or components can also be included in the clustered network environment 100 in other examples. This technology provides a number of advantages including methods, non-transitory computer readable media, and devices that facilitate copy-free data migration across filesystems in order to reduce disruption and the time required to transition data.

In this example, node computing devices 106(1)-106(n) can be primary or local storage controllers or secondary or remote storage controllers that provide client devices 108(1)-108(n), with access to data stored within data storage devices 110(1)-110(n). The data storage apparatuses 102(1)-102(n) and/or node computing device 106(1)-106(n) of the examples described and illustrated herein are not limited to any particular geographic areas and can be clustered locally and/or remotely. Thus, in one example the data storage apparatuses 102(1)-102(n) and/or node computing device 106(1)-106(n) can be distributed over a plurality of storage systems located in a plurality of geographic locations; while in another example a clustered network can include data storage apparatuses 102(1)-102(n) and/or node computing device 106(1)-106(n) residing in a same geographic location (e.g., in a single onsite rack).

In the illustrated example, one or more of the client devices 108(1)-108(n), which may be, for example, personal computers (PCs), computing devices used for storage (e.g., storage servers), and other computers or peripheral devices, are coupled to the respective data storage apparatuses 102(1)-102(n) by storage network connections 112(1)-112(n). Network connections 112(1)-112(n) may include a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc.

Illustratively, the client devices 108(1)-108(n) may be general-purpose computers running applications, and may interact with the data storage apparatuses 102(1)-102(n) using a client/server model for exchange of information. That is, the client devices 108(1)-108(n) may request data from the data storage apparatuses 102(1)-102(n) (e.g., data on one of the data storage devices 110(1)-110(n) managed by a network storage control configured to process I/O commands issued by the client devices 108(1)-108(n)), and the data storage apparatuses 102(1)-102(n) may return results of the request to the client devices 108(1)-108(n) via the storage network connections 112(1)-112(n).

The node computing devices 106(1)-106(n) of the data storage apparatuses 102(1)-102(n) can include network or host nodes that are interconnected as a cluster to provide data storage and management services, such as to an enterprise having remote locations, cloud storage (e.g., a storage endpoint may be stored within a data cloud), etc., for example. Such a node computing device 106(1)-106(n) can be a device attached to the fabric 104 as a connection point, redistribution point, or communication endpoint, for example. One or more of the node computing devices 106(1)-106(n) may be capable of sending, receiving, and/or forwarding information over a network communications channel, and could comprise any type of device that meets any or all of these criteria.

In an example, the node computing device 106(1) may be located on a first storage site and the node computing device 106(*n*) may be located at a second storage site. The node computing devices 106(1) and 106(*n*) may be configured according to a disaster recovery configuration whereby a surviving node provides switchover access to the storage devices 110(1)-110(*n*) in the event a disaster occurs at a disaster storage site (e.g., the node computing device 106(1) provides client device 112(*n*) with switchover data access to storage devices 110(*n*) in the event a disaster occurs at the second storage site). In other examples, the node computing device 106(*n*) can be configured according to an archival configuration and/or the node computing devices 106(1)-106(*n*) can be configured based on another type of replication arrangement (e.g., to facilitate load sharing). Additionally, while two node computing devices are illustrated in FIG. 1, any number of node computing devices or data storage apparatuses can be included in other examples in other types of configurations or arrangements.

As illustrated in the clustered network environment 100, node computing devices 106(1)-106(*n*) can include various functional components that coordinate to provide a distributed storage architecture. For example, the node computing devices 106(1)-106(*n*) can include network modules 114(1)-114(*n*) and disk modules 116(1)-116(*n*). Network modules 114(1)-114(*n*) can be configured to allow the node computing devices 106(1)-106(*n*) (e.g., network storage controllers) to connect with client devices 108(1)-108(*n*) over the storage network connections 112(1)-112(*n*), for example, allowing the client devices 108(1)-108(*n*) to access data stored in the clustered network environment 100.

Further, the network modules 114(1)-114(*n*) can provide connections with one or more other components through the cluster fabric 104. For example, the network module 114(1) of node computing device 106(1) can access the data storage device 110(*n*) by sending a request via the cluster fabric 104 through the disk module 116(*n*) of node computing device 106(*n*). The cluster fabric 104 can include one or more local and/or wide area computing networks embodied as Infiniband, Fibre Channel (FC), or Ethernet networks, for example, although other types of networks supporting other protocols can also be used.

Disk modules 116(1)-116(*n*) can be configured to connect data storage devices 110(1)-110(2), such as disks or arrays of disks, SSDs, flash memory, or some other form of data storage, to the node computing devices 106(1)-106(*n*). Often, disk modules 116(1)-116(*n*) communicate with the data storage devices 110(1)-110(*n*) according to the SAN protocol, such as SCSI or FCP, for example, although other protocols can also be used. Thus, as seen from an operating system on node computing devices 106(1)-106(*n*), the data storage devices 110(1)-110(*n*) can appear as locally attached. In this manner, different node computing devices 106(1)-106(*n*), etc. may access data blocks through the operating system, rather than expressly requesting abstract files.

While the clustered network environment 100 illustrates an equal number of network modules 114(1)-114(2) and disk modules 116(1)-116(*n*), other examples may include a differing number of these modules. For example, there may be a plurality of network and disk modules interconnected in a cluster that do not have a one-to-one correspondence between the network and disk modules. That is, different node computing devices can have a different number of network and disk modules, and the same node computing device can have a different number of network modules than disk modules.

Further, one or more of the client devices 108(1)-108(*n*) can be networked with the node computing devices 106(1)-106(*n*) in the cluster, over the storage connections 112(1)-112(*n*). As an example, respective client devices 108(1)-108(*n*) that are networked to a cluster may request services (e.g., exchanging of information in the form of data packets) of node computing devices 106(1)-106(*n*) in the cluster, and the node computing devices 106(1)-106(*n*) can return results of the requested services to the client devices 108(1)-108(*n*). In one example, the client devices 108(1)-108(*n*) can exchange information with the network modules 114(1)-114(*n*) residing in the node computing devices 106(1)-106(*n*) (e.g., network hosts) in the data storage apparatuses 102(1)-102(*n*).

In one example, the storage apparatuses 102(1)-102(*n*) host aggregates corresponding to physical local and remote data storage devices, such as local flash or disk storage in the data storage devices 110(1)-110(*n*), for example. One or more of the data storage devices 110(1)-110(*n*) can include mass storage devices, such as disks of a disk array. The disks may comprise any type of mass storage devices, including but not limited to magnetic disk drives, flash memory, and any other similar media adapted to store information, including, for example, data (D) and/or parity (P) information.

The aggregates include volumes 118(1)-118(*n*) in this example, although any number of volumes can be included in the aggregates. The volumes 118(1)-118(*n*) are virtual data stores that define an arrangement of storage and one or more filesystems within the clustered network environment 100. Volumes 118(1)-118(*n*) can span a portion of a disk or other storage device, a collection of disks, or portions of disks, for example, and typically define an overall logical arrangement of file storage. In one example volumes 118(1)-118(*n*) can include stored user data as one or more files or objects that reside in a hierarchical directory structure within the volumes 118(1)-118(*n*). Volumes 118(1)-118(*n*) are typically configured in formats that may be associated with particular storage systems, and respective volume formats typically comprise features that provide functionality to the volumes 118(1)-118(*n*), such as providing an ability for volumes 118(1)-118(*n*) to form clusters and perform deduplication, among other functionality.

In one example, to facilitate access to data stored on the disks or other structures of the data storage device 110(1)-110(*n*), a filesystem may be implemented that logically organizes the information as a hierarchical structure of directories and files. In this example, respective files may be implemented as a set of disk blocks of a particular size that are configured to store information, whereas directories may be implemented as specially formatted files in which information about other files and directories are stored.

Data can be stored as files or objects within a physical volume and/or a virtual volume, which can be associated with respective volume identifiers. The physical volumes correspond to at least a portion of physical storage devices, such as the data storage devices 110(1)-110(*n*) (e.g., a Redundant Array of Independent (or Inexpensive) Disks (RAID system)) whose address, addressable space, location, etc. does not change. Typically the location of the physical volumes does not change in that the range of addresses used to access it generally remains constant.

Virtual volumes, in contrast, can be stored over an aggregate of disparate portions of different physical storage devices. Virtual volumes may be a collection of different available portions of different physical storage device locations, such as some available space from disks, for example. It will be appreciated that since the virtual volumes are not "tied" to any one particular storage device, virtual volumes can be said to include a layer of abstraction or virtualization, which allows it to be resized and/or flexible in some regards.

Further, virtual volumes can include one or more logical unit numbers (LUNs), directories, Qtrees, and/or files. Among other things, these features, but more particularly the LUNS, allow the disparate memory locations within which data is stored to be identified, for example, and grouped as data storage unit. As such, the LUNs may be characterized as constituting a virtual disk or drive upon which data within the virtual volumes is stored within an aggregate. For example, LUNs are often referred to as virtual drives, such that they emulate a hard drive, while they actually comprise data blocks stored in various parts of a volume.

In one example, the data storage devices 110(1)-110(n) can have one or more physical ports, wherein each physical port can be assigned a target address (e.g., SCSI target address). To represent respective volumes, a target address on the data storage devices 110(1)-110(n) can be used to identify one or more of the LUNs. Thus, for example, when one of the node computing devices 106(1)-106(n) connects to a volume, a connection between the one of the node computing devices 106(1)-106(n) and one or more of the LUNs underlying the volume is created.

Respective target addresses can identify multiple of the LUNs, such that a target address can represent multiple volumes. The I/O interface, which can be implemented as circuitry and/or software in a storage adapter or as executable code residing in memory and executed by a processor, for example, can connect to volumes by using one or more addresses that identify the one or more of the LUNs.

Figure 2:
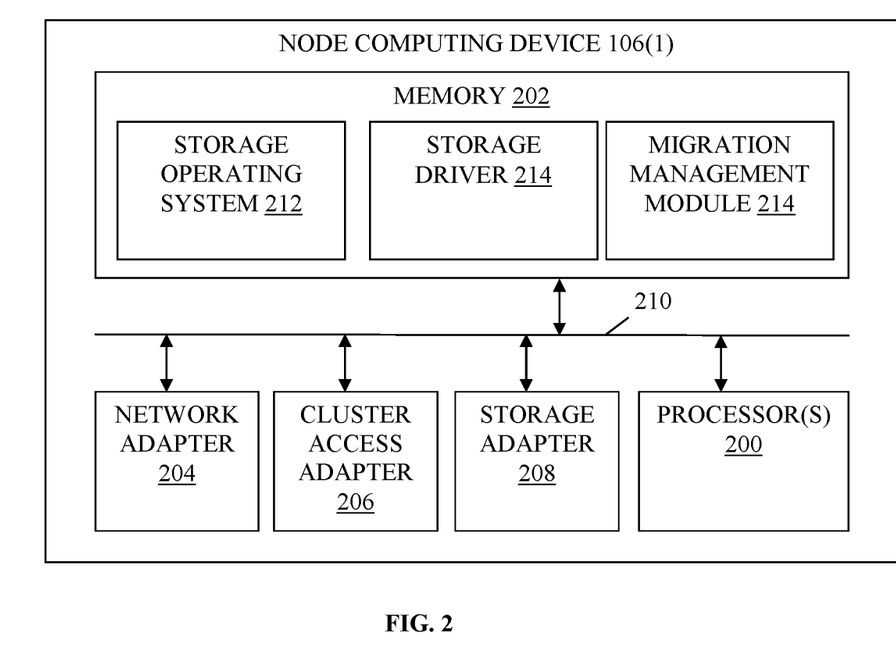
FIG. 2 is a block diagram of an exemplary one of the node computing devices shown in FIG. 1.

Referring to FIG. 2, node computing device 106(1) in this particular example includes processor(s) 200, a memory 202, a network adapter 204, a cluster access adapter 206, and a storage adapter 208 interconnected by a system bus 210. The node computing device 106 also includes a storage operating system 212 installed in the memory 206 that can, for example, implement a RAID data loss protection and recovery scheme to optimize reconstruction of data of a failed disk or drive in an array. In some examples, the node computing device 106(n) is substantially the same in structure and/or operation as node computing device 106(1), although the node computing device 106(n) can also include a different structure and/or operation in one or more aspects than the node computing device 106(1).

The storage operating system 212 can also manage communications for the node computing device 106(1) among other devices that may be in a clustered network, such as attached to a cluster fabric 104. Thus, the node computing device 106(1) can respond to client device requests to manage data on one of the data storage devices 110(1)-110(n) (e.g., or additional clustered devices) in accordance with the client device requests.

The storage operating system 212 can also establish one or more filesystems including software code and data structures that implement a persistent hierarchical namespace of files and directories, for example. As an example, when a new data storage device (not shown) is added to a clustered network system, the storage operating system 212 is informed where, in an existing directory tree, new files associated with the new data storage device are to be stored. This is often referred to as "mounting" a filesystem.

In the example node computing device 106(1), memory 202 can include storage locations that are addressable by the processor(s) 200 and adapters 204, 206, and 208 for storing related software application code and data structures. The processor(s) 200 and adapters 204, 206, and 208 may, for example, include processing elements and/or logic circuitry configured to execute the software code and manipulate the data structures.

The storage operating system 212, portions of which are typically resident in the memory 202 and executed by the processor(s) 200, invokes storage operations in support of a file service implemented by the node computing device 106(1). Other processing and memory mechanisms, including various computer readable media, may be used for storing and/or executing application instructions pertaining to the techniques described and illustrated herein. For example, the storage operating system 212 can also utilize one or more control files (not shown) to aid in the provisioning of virtual machines.

In this particular example, the memory 202 further includes a migration management module 214, although the functionality provided by the migration management module 214 could be carried out by the storage operating system 212 or another module or applications stored in the memory 202. The migration management module 214 obtains instructions to migrate data from a source filesystem (e.g., associated with volume 118(1)) to a destination filesystem (e.g., associated with volume 118(n)), in order to facilitate a filesystem upgrade or other transition, for example. The instructions can be received from a network administrator or can be automatically generated by the node computing device 106(1) in order to improve or optimize data storage within the cluster.

In response, the migration management module 214 scans data structures (e.g., inodes) of the source volume and sends filesystem metadata contained therein to a destination filesystem. The filesystem metadata includes pointers or references to user data hosted by the source filesystem. Subsequent to transferring the filesystem metadata stored in the inodes associated with the source filesystem, ownership of the source volume is transitioned to the destination filesystem or a node computing device hosting the destination filesystem. Accordingly, the data migration across filesystems is facilitated without the user data being copied in this example, as described and illustrated in more detail later.

In another example, the migration management module 214 can receive an indication that data is being migrated to a destination filesystem associated with a destination volume hosted by the node computing device 106(1). In this example, the migration management module 214 facilitates receipt of filesystem metadata associated with a source filesystem and generates filesystem metadata associated with the destination volume that corresponds with an addressing scheme or other layout or format of the destination filesystem, also as described and illustrated in more detail later.

Accordingly, the examples of the technology described and illustrated herein may be embodied as one or more non-transitory computer readable media having machine or processor-executable instructions stored thereon for one or more aspects of the present technology, which when executed by the processor(s) 200, cause the processor(s) 200 to carry out the steps necessary to implement the methods of this technology, as described and illustrated with the examples herein. In some examples, the executable instructions are configured to perform one or more steps of a method, such as one or more of the exemplary methods described and illustrated later with reference to FIGS. 3-5, for example.

The network adapter 204 in this example includes the mechanical, electrical and signaling circuitry needed to connect the node computing device 106(1) to one or more of the client devices 108(1)-108(n) over storage network connections 112(1)-112(n), which may comprise, among other things, a point-to-point connection or a shared medium, such as a local area network. In some examples, the network adapter 204 further communicates (e.g., using TCP/IP) via the fabric 104 and/or another network (e.g. a WAN) (not shown) with cloud storage devices to process storage operations associated with data stored thereon.

The storage adapter 208 cooperates with the storage operating system 212 executing on the node computing device 106(1) to access information requested by one of the client devices 108(1)-108(n) (e.g., to access data on a data storage device 110(1)-110(n) managed by a network storage controller). The information may be stored on any type of attached array of writeable media such as magnetic disk drives, flash memory, and/or any other similar media adapted to store information.

In the exemplary data storage devices 110(1)-110(n), information can be stored in data blocks on disks. The storage adapter 208 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 208 and, if necessary, processed by the processor(s) 200 (or the storage adapter 208 itself) prior to being forwarded over the system bus 210 to the network adapter 204 (and/or the cluster access adapter 206 if sending to another node computing device in the cluster) where the information is formatted into a data packet and returned to a requesting one of the client devices 108(1)-108(2) and/or sent to another node computing device attached via the cluster fabric 104. In some examples, a storage driver 214 in the memory 202 interfaces with the storage adapter to facilitate interactions with the data storage devices 110(1)-110(n).

Figure 3:
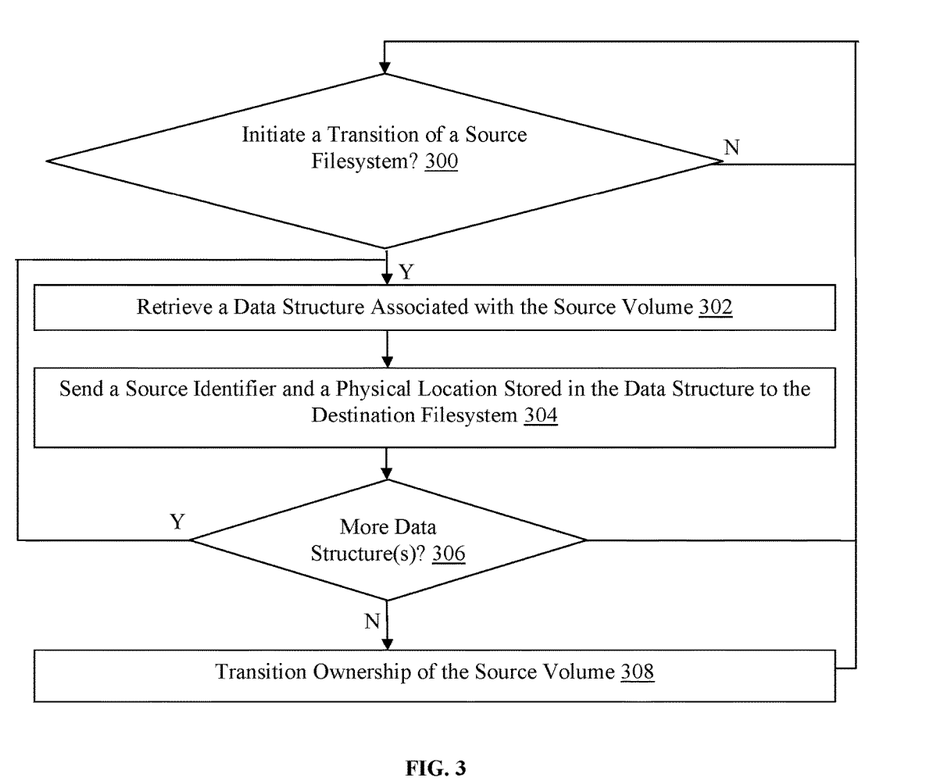
FIG. 3 is a flowchart of an exemplary method for facilitating copy-free migration by a node computing device hosting a source filesystem.

Referring to FIG. 3, an exemplary method for facilitating copy-free migration by the node computing device 106(1) hosting a source filesystem is illustrated. In step 300 in this example, the node computing device 106(1) determines whether a transition of a source filesystem has been initiated. The transition can be initiated based on instructions received manually from a network administrator or generated automatically in response to conditions of the node computing device 106(1) or the associated storage network, for example. Additionally, the instructions initiating the transition can include an indication of a destination filesystem and/or associated volume, among other information.

In this example, the source filesystem is associated with the volume 118(1) hosted by the node computing device 106(1) and the destination filesystem is associated with the volume 118(n) hosted by the node computing device 106(n), although the destination filesystem can be hosted by the node computing device 106(1) or another node computing device in the storage network in other examples. Irrespective of the node computing device hosting the source and destination volumes, the volumes 118(1) and 118(n) in this example are hosted by the same aggregate, belong to the same cluster, and share a physical volume block number (PVBN) namespace that is unique across the cluster. The transition can be of the source filesystem to a new destination filesystem or to a destination filesystem that is an upgraded version of the source filesystem, for example.

Accordingly, if the node computing device 106(1) determines that a transition of a source filesystem has not been initiated, then the No branch is taken back to step 300 and the node computing device 106(1) effectively waits for a transition to be initiated and continues to service requests received from the client devices 108(1)-108(n). However, if the node computing device 106(1) determines in step 300 that a transition of a source filesystem has been initiated, then the Yes branch is taken to step 302.

In step 302, the node computing device 106(1) retrieves a data structure associated with the volume 118(1), which is the source volume associated with the source filesystem in this example. The data structure is retrieved as part of a scanning process in which all of the data structures associated with the source filesystem are accessed in order to retrieve and send filesystem metadata stored therein. The filesystem metadata includes one or more pointer(s) or reference(s) to blocks of user data associated with files or objects stored on the data storage device 110(1) in the volume 118(1). In this particular example, the data structures are inodes, although other types of data structure can be used, and the filesystem metadata can be stored in other locations, in other examples.

In step 304, the node computing device 106(1) sends a set of filesystem metadata stored in the retrieved data structure to the destination filesystem hosted by the node computing device 106(n). In this example, the filesystem metadata includes at least a source identifier and a physical location, which can be a virtual volume block number (VVBN) and a PVBN, respectively, in one example, although other types of filesystem metadata can also be retrieved and sent in step 304.

The VVBN in this example is an abstraction utilized by the volume 118(1) and corresponds to the PVBN, which is a particular physical location on the data storage device 110(1) storing a block of user data. Accordingly, the source filesystem has a block addressing scheme in this example, although other types of addressing schemes, layouts, and/or formats can be used in other examples. Additionally, each inode can have any number of pairs of VVBNs and PVBNs, associated with various blocks of user data associated with a file or object, which can be sent in step 304.

In step 306, the node computing device 106(1) determines whether there are more data structure(s) associated with the source filesystem. If the node computing device 106(1) determines that there are more data structure(s), then the Yes branch is taken back to step 302 and the node computing device 106(1) continues scanning the data structures and sending the filesystem metadata. However, if the node computing device 106(1) determines in step 306 that there are no more data structure(s) associated with the source filesystem to be scanned, then the No branch is taken to step 308.

In step 308, the node computing device 106(1) transitions ownership of the source volume to the node computing device 106(n) hosting the destination volume 118(n) associated with the destination filesystem. The node computing device 106(1) optionally updates an entry of a database of the cluster in order to transition the volume 118(1), although other methods of transitioning the volume 118(1) can also be used. Accordingly, the node computing device 106(1) advantageously proceeds with a data migration without copying any user data, and by sending only filesystem metadata, in order to facilitate transition of the associated filesystem by node computing device 106(n), as described and illustrated in more detail with reference to FIG. 4-5.

Figure 4:
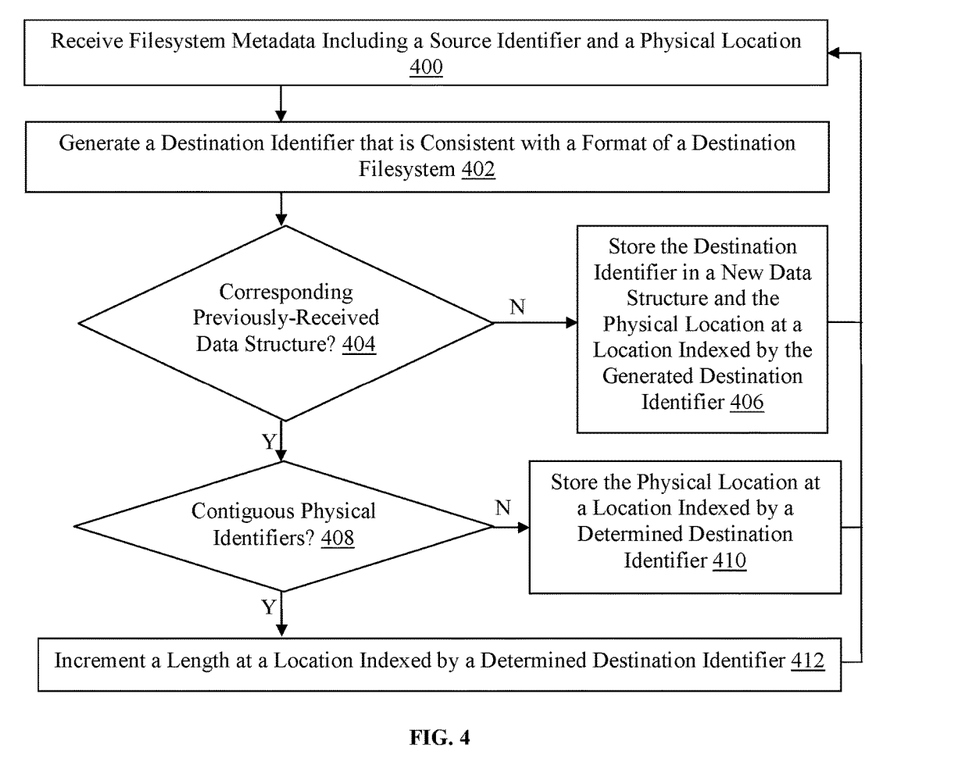
FIG. 4 is a flowchart of an exemplary method for facilitating copy-free migration by a node computing device hosting a destination filesystem.

Referring more specifically to FIG. 4, a flowchart of an exemplary method for facilitating copy-free migration by the node computing device 106(n) hosting a destination filesystem is illustrated. In step 400 in this example, the node computing device 106(n) receives filesystem metadata including at least a source identifier and a physical location. In this example, the filesystem metadata is received from the node computing device 106(1) hosting the volume 118(1) associated with the source filesystem, although the filesystem metadata can be received from another location in other examples. The source filesystem utilizes a block addressing scheme, the source identifier is a VVBN, and the physical location is a PVBN in this example, although other types of schemes and file system metadata can also be used.

In step 402, the node computing device 106(n) generates a destination identifier that is consistent with a format of a destination filesystem. The destination filesystem is associated with the volume 118(n) and utilizes an extent-based addressing scheme or format in this example. However, other formats could also be used, including a block addressing scheme, and the destination volume could also be located elsewhere in the storage network. Accordingly, the generated destination identifier is an extent name in this example, and the extent name optionally corresponds to the VVBN and/or is derived therefrom.

In step 404, the node computing device 106(n) optionally determines whether another set of filesystem metadata from a same data structure (e.g., inode) was received. In this particular example, the unit of storage (e.g., a fragment) in the destination filesystem is larger (e.g., 8 kb) than the unit of storage (e.g., a block) in the source filesystem (e.g., 4 kb), although other types of units of storage and sizes can be used, and the units of storage can also be the same size in other examples.

Since the unit size for user data in the destination filesystem is double that of the source filesystem, the destination filesystem in this example determines whether more than one physical location received with filesystem metadata from a same data structure should be associated with a same extent name, as described and illustrated in steps 410 and 412, for example. In other examples in which the unit size for user data is the same between the source and destination filesystems, optional steps 404 and 408-412 are not performed, as in the example described and illustrated in more detail later with reference to FIG. 5.

In some examples, a data structure identifier (e.g., an inode number), sent along with the filesystem metadata and received in step 400, can be used to determine whether another set of filesystem metadata was previously received from a same data structure, although other methods of determining whether another set of filesystem metadata was previously received from a same data structure can also be used. Accordingly, in this particular example, if the node computing device 106(n) determines in step 404 that another set of filesystem metadata from a same data structure was not received, then the No branch is taken to step 406.

In step 406, the node computing device 106(n) generates a new data structure (e.g., another inode) associated with the destination filesystem and stores the generated destination identifier in the newly-generated data structure. The node computing device 106(n) also stores the physical location received in step 400 at a location (e.g., an entry of an extent map) that is indexed by the generated destination identifier. Thereby, the physical location is referenced by the extent name in the destination filesystem, and a data copy is not required in order to effectively migrate the associated user data stored at the physical location to the destination filesystem. However, if the node computing device 106(n) determines in step 404 that another set of filesystem metadata was previously received from a same data structure, then the Yes branch is taken to step 408.

In step 408, the node computing device 106(n) optionally determines whether the physical locations received with the multiple sets of filesystem metadata associated with the same data structure are contiguous. In this particular example the destination identifiers are sequential and the node computing device 106(n) can determine the destination identifier, which was generated upon receiving another set of filesystem metadata associated with the same data structure in a prior iteration, by subtracting or performing another operation on the destination identifier generated in step 402. Other methods of determining the destination identifier generated in a prior iteration from another set of filesystem metadata associated with a same data structure can also be used.

The node computing device 106(n) can then use the determined destination identifier generated in the prior iteration as an index to retrieve an entry of the extent map. The node computing device 106(n) then compares the physical location included therein with the physical location received in step 400 to determine whether the physical locations are contiguous. Other methods for determining whether the physical locations are contiguous can also be used in other examples. If the node computing device 106(n) determines that the physical locations received with the multiple sets of filesystem metadata associated with the same data structure are not contiguous, then the No branch is taken from step 408 to step 410.

In step 410, the node computing device 106(n) stores the physical location received in step 400 at a location in the extent map indexed by the determined destination identifier generated in the prior iteration. Accordingly, the determined destination identifier generated in the prior iteration now corresponds to an entry of the extent map that includes two physical locations that are not contiguous. In this iteration, the destination identifier generated in step 402 can be discarded. Referring back to step 408, if the destination node computing device 106(n) determines that the physical locations received with the multiple sets of filesystem metadata associated with the same data structure are contiguous, then the Yes branch is taken from to step 412.

In step 412, the node computing device 106(n) inserts or increments a length at a location indexed by the destination identifier generated in the prior iteration. Accordingly, the length is used to represent the physical location received in step 400 and the destination identifier generated in the prior iteration corresponds to an entry of the extent map that includes a physical location and a length, which collectively corresponds to the two physical locations. While the length is used in step 412 in this example, the physical location could also be inserted into the extent map, as described and illustrated earlier with reference to step 410, even in iterations in which the physical locations are contiguous. The destination identifier generated in step 402 can also be discarded in this iteration.

Subsequent to steps 406, 410, and 412, the node computing device 106(n) proceeds back to step 400 in this example and receives any additional filesystem metadata from the node computing device 106(1). If all of the filesystem metadata associated with the source filesystem has been transmitted, then ownership of the source volume 118(1) is transitioned to the node computing device 106(n), as described and illustrated in more detail earlier with reference to step 308 of FIG. 3, and node computing device 106(n) begins servicing requests for user data using the destination file system.

Figure 5:
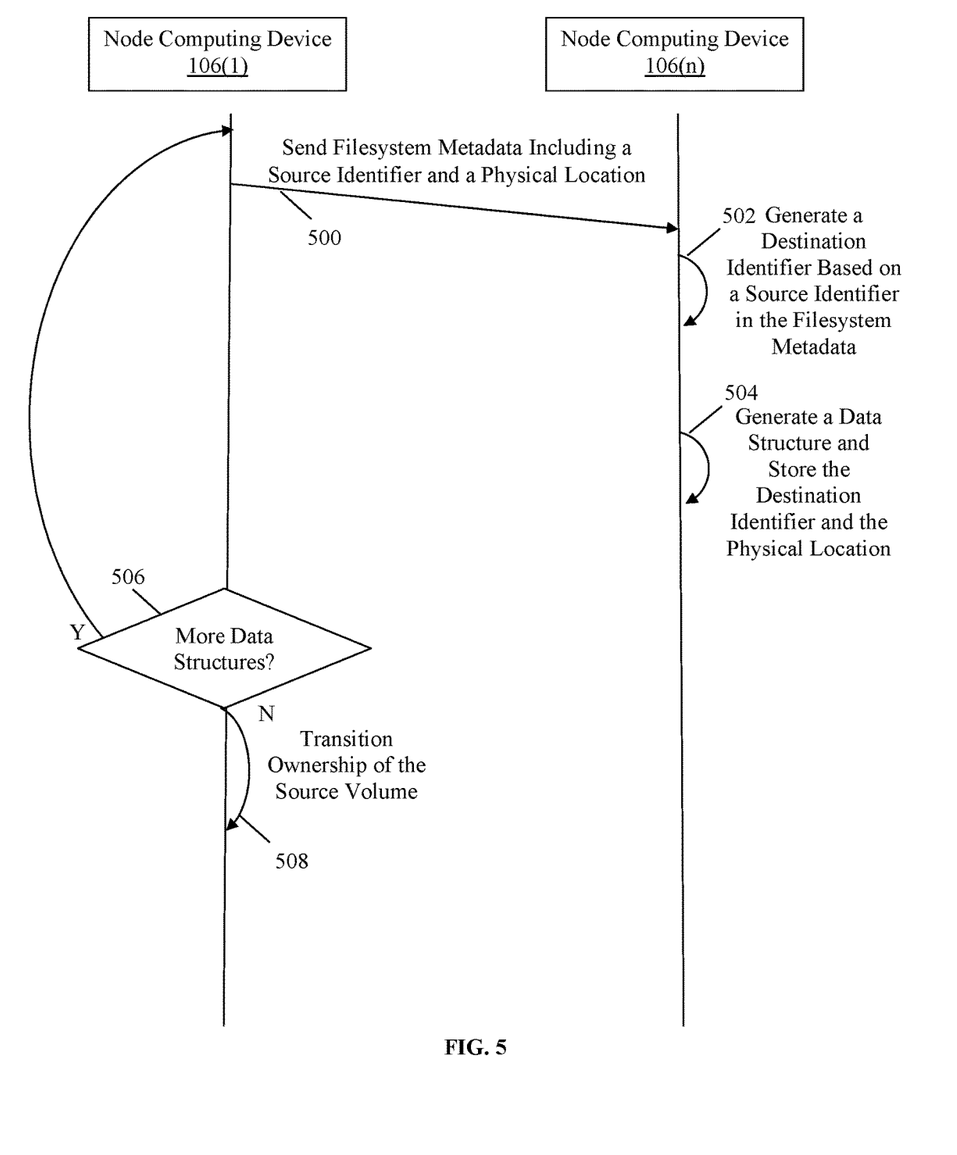
FIG. 5 is a timing diagram of an exemplary method for copy-free data migration across filesystems.

Referring more specifically to FIG. 5, a timing diagram of an exemplary method for copy-free data migration across filesystems is illustrated. In step 500 in this example, the node computing device 106(1) begins a scan of a source filesystem to access a data structure (e.g., an inode) and retrieve and send filesystem metadata stored in the data structure to the node computing device 106(n) hosting a destination filesystem. The filesystem metadata includes a source identifier (e.g., a VVBN) and a physical location (e.g., a PVBN), which is a reference to a unit (e.g., a block) of user data hosted by a source volume associated with the source filesystem and stored on a data storage device.

In step 502, the node computing device 106(n) generates a destination identifier based on the source identifier. The destination identifier is consistent with a format of the destination filesystem. For example, if the destination filesystem utilizes an extent-based addressing scheme, the destination identifier can be an extent name. The extent name can correspond to the source identifier and, in some examples, the source identifier can be derived from the destination identifier (e.g., by applying a hash or other function).

In step 504, the node computing device 106(n) generates a new data structure (e.g., an inode) that is associated with the destination filesystem and stores at least the destination identifier in the data structure. The node computing device 106(n) also stores the physical location, such as an entry of an extent map that is indexed by the destination identifier, for example, although the physical location can be stored elsewhere including in the new data structure.

In this example, the storage unit size is the same as utilized by the source filesystem and the destination filesystem. Accordingly, each entry inserted into the extent map will include one physical location and each extent name will correlate with one physical location stored in an entry of the extent map indexed by the extent name. In other examples, the storage unit size can be smaller or larger as utilized by the destination filesystem, and the node computing device 106(n) can adjust the generation of data structures and source identifiers, and the storage of the source identifiers and the physical locations, accordingly.

In step 506, the node computing device 106(1) determines whether there is at least one additional data structure to be scanned that is associated with the source filesystem. If the node computing device 106(1) determines that there is at least one additional data structure to be scanned, then the Yes branch is taken back to step 500 and the node computing device 106(1) again accesses the data structure and sends the associated filesystem metadata to the node computing device 106(n), as described and illustrated in more detail earlier. However, if the node computing device 106(1) determines in step 506 that there is not at least one additional data structure to be scanned, then the No branch is taken to step 508.

In step 508, the node computing device 106(1) transitions ownership of the source volume to the node computing device 106(n). Accordingly, the user data associated with the source filesystem hosted by the source volume is migrated in this example without making any copies. Subsequent to the transition, the node computing device 106(1) can cease servicing requests from the client device 108(1)-108(n) for the user data and the node computing device 106(n) can begin servicing requests from the client devices 108(1)-108(n) for the user data. Accordingly, the client devices 108(1)-108(n) will not experience any disruption.

By copying only filesystem metadata including pointers or references to user data stored on data storage devices, this technology facilitates relatively efficient filesystem upgrades and transitions. With this technology, data can be more efficiently migrated across filesystems without being copied, in reduced time, and without causing disruptions to applications. Moreover, storage efficiencies (e.g., deduplication, compression, and cloning) are advantageously preserved during a filesystem upgrade or transition.

With respect to deduplication by way of example only, a second block with the same content can point to a first block in an extent-based destination filesystem when a migration is initiated with respect to a data structure in a block-based source filesystem, that has filesystem metadata identifying an additional reference for the first blocks with the same content as the second block. Other types and number of filesystem metadata associated with other storage efficiencies can be preserved in other examples.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method, comprising:
receiving, by a computing device, a first set of filesystem metadata associated with a first filesystem having a first addressing scheme, wherein the first set of filesystem metadata is retrieved from a first data structure associated with the first filesystem and comprises a first identifier and a physical location associated with user data;
generating, by the computing device, a second identifier from the first identifier, wherein the second identifier is consistent with a second addressing scheme of a second filesystem that is a different type of addressing scheme than the first addressing scheme; and
storing, by the computing device, a second set of filesystem metadata comprising the second identifier and the physical location, wherein the second identifier is stored in a second data structure associated with the second filesystem.

2. The method of claim 1, wherein the first addressing scheme comprises a block addressing scheme and the second addressing scheme comprises an extent-based addressing scheme.

3. The method of claim 1, further comprising storing, by the computing device, the physical location in an entry of an extent map associated with the second filesystem, wherein the second identifier is an index to the entry of the extent map comprising the physical location.

4. The method of claim 3, further comprising determining, by the computing device, when another physical location included in a received third set of filesystem metadata is contiguous with the physical location, when the third set of metadata is associated with the first data structure.

5. The method of claim 4, further comprising incrementing, by the computing device, a length in the entry of the extent map, when the determining indicates that the other physical location is contiguous with the physical location.

6. The method of claim 4, further comprising inserting, by the computing device, the other physical location in the entry of the extent map, when the determining indicates that the other physical location is not contiguous with the physical location.

7. A computing device, comprising:
a memory containing machine readable medium comprising machine executable code having stored thereon instructions for copy-free data migrations across filesystems; and
a processor coupled to the memory, the processor configured to execute the machine executable code to cause the processor to:
receive a first set of filesystem metadata associated with a first filesystem having a first addressing scheme, wherein the first set of filesystem metadata is retrieved from a first data structure associated with the first filesystem and comprises a first identifier and a physical location associated with user data;
generate a second identifier from the first identifier wherein the second identifier is consistent with a second addressing scheme of a second filesystem that is a different type of addressing scheme than the first addressing scheme; and
store a second set of filesystem metadata comprising the second identifier and the physical location, wherein the second identifier is stored in a second data structure associated with the second filesystem.

8. The computing device of claim 7, wherein the first addressing scheme comprises a block addressing scheme and the second addressing scheme comprises an extent-based addressing scheme.

9. The computing device of claim 7, wherein the processor is further configured to execute the machine executable code to further cause the processor to store the physical location in an entry of an extent map associated with the second filesystem, wherein the second identifier is an index to the entry of the extent map comprising the physical location.

10. The computing device of claim 9, wherein the machine executable code to further cause the processor to determine when another physical location included in a received third set of filesystem metadata is contiguous with the physical location, when the third set of metadata is associated with the first data structure.

11. The computing device of claim 10, wherein the processor is further configured to execute the machine executable code to further cause the processor to increment a length in the entry of the extent map, when the determining indicates that the other physical location is contiguous with the physical location.

12. The computing device of claim 11, wherein the processor is further configured to execute the machine executable code to further cause the processor to insert the other physical location in the entry of the extent map, when the determining indicates that the other physical location is not contiguous with the physical location.

13. A non-transitory machine readable medium having stored thereon instructions for copy-free data migrations across filesystems comprising machine executable code which when executed by at least one machine causes the machine to:
receive a first set of filesystem metadata associated with a first filesystem having a first addressing scheme, wherein the first set of filesystem metadata is retrieved from a first data structure associated with the first filesystem and comprises a first identifier and a physical location associated with user data;
generate a second identifier from the first identifier, wherein the second identifier is consistent with a second addressing scheme of a second filesystem that is a different type of addressing scheme than the first addressing scheme; and
store a second set of filesystem metadata comprising the second identifier and the physical location, wherein the second identifier is stored in a second data structure associated with the second filesystem.

14. The non-transitory machine readable medium of claim 13, wherein the first addressing scheme comprises a block addressing scheme and the second addressing scheme comprises an extent-based addressing scheme.

15. The non-transitory machine readable medium of claim 13, wherein the machine executable code when executed by the machine further causes the machine to store the physical location in an entry of an extent map associated with the second filesystem, wherein the second identifier is an index to the entry of the extent map comprising the physical location.

16. The non-transitory machine readable medium of claim 15, wherein the machine executable code when executed by the machine further causes the machine to determine when another physical location included in a received third set of filesystem metadata is contiguous with the physical location, when the third set of metadata is associated with the first data structure.

17. The non-transitory machine readable medium of claim 16, wherein the machine executable code when executed by the machine further causes the machine to increment a length in the entry of the extent map, when the determining indicates that the other physical location is contiguous with the physical location.

18. The non-transitory machine readable medium of claim 16, wherein the machine executable code when executed by the machine further causes the machine to insert the other physical location in the entry of the extent map, when the determining indicates that the other physical location is not contiguous with the physical location.

* * * * *